(12) United States Patent
Sano

(10) Patent No.: US 12,540,648 B2
(45) Date of Patent: Feb. 3, 2026

(54) CONTROLLER OF VEHICLE, VEHICLE INCLUDING CONTROLLER, AND METHOD OF CONTROLLING VEHICLE

(71) Applicant: KAWASAKI MOTORS, LTD., Akashi (JP)

(72) Inventor: Katsuya Sano, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/584,842

(22) Filed: Feb. 22, 2024

(65) Prior Publication Data
US 2024/0288037 A1 Aug. 29, 2024

(30) Foreign Application Priority Data
Feb. 24, 2023 (JP) .................................. 2023-27431

(51) Int. Cl.
*F16D 48/06* (2006.01)
*B60W 10/02* (2006.01)
*B60W 10/04* (2006.01)

(52) U.S. Cl.
CPC ............. *F16D 48/06* (2013.01); *B60W 10/02* (2013.01); *B60W 10/04* (2013.01);
(Continued)

(58) Field of Classification Search
CPC ........... F16D 48/06; F16D 2500/10412; F16D 2500/1045; F16D 2500/30412;
(Continued)

(56) References Cited

U.S. PATENT DOCUMENTS

2011/0320077 A1   12/2011  Choi
2013/0079967 A1*  3/2013  Terakawa .............. B60W 10/06
                                                       180/65.265

(Continued)

FOREIGN PATENT DOCUMENTS

DE      102007056886 A1   6/2008
DE      102007055794 A1   6/2009
(Continued)

*Primary Examiner* — Lori Wu
(74) *Attorney, Agent, or Firm* — Alleman Hall & Tuttle LLP

(57) ABSTRACT

A controller of a vehicle according to one aspect is a controller of a vehicle including: a driving source; a driving wheel; a friction clutch that transmits torque corresponding to an engagement amount of the friction clutch; a clutch actuator that changes the engagement amount of the friction clutch; and an acceleration operation sensor. The controller includes processing circuitry configured to: determine whether or not the friction clutch is in an engaged state; when it is determined that the friction clutch is not in the engaged state, control the clutch actuator such that the engagement amount of the friction clutch becomes a value corresponding to the acceleration operation amount received from the acceleration operation sensor; and control the driving source such that output torque of the driving source becomes a value corresponding to the engagement amount or a value corresponding to a parameter corresponding to the engagement amount.

16 Claims, 7 Drawing Sheets

(52) U.S. Cl.
CPC ............. *B60W 2710/021* (2013.01); *F16D 2500/10412* (2013.01); *F16D 2500/1045* (2013.01); *F16D 2500/30412* (2013.01)

(58) Field of Classification Search
CPC ...... B60W 10/02; B60W 10/04; B60W 10/06; B60W 2710/0644; B60W 2710/0666; B60W 2710/022; B60W 2710/027; B60W 2710/021; B60W 2540/10; B60W 2510/0208; B60W 2510/0638; B60W 2510/1005; B60W 2300/36; B60W 30/18027; B60W 30/1884; B60W 2050/0026
See application file for complete search history.

(56) References Cited

U.S. PATENT DOCUMENTS

2013/0269644 A1 10/2013 Arai
2017/0282920 A1* 10/2017 Ortseifen .............. B60W 50/10

FOREIGN PATENT DOCUMENTS

| | | |
|---|---|---|
| EP | 2349800 | 4/2010 |
| FR | 2794509 A1 | 12/2000 |
| FR | 2833895 A1 | 6/2003 |
| FR | 2957645 A3 | 9/2011 |
| WO | 2012090569 A1 | 7/2012 |
| WO | 2017119835 A1 | 7/2017 |

* cited by examiner

CONTROLLER OF VEHICLE, VEHICLE INCLUDING CONTROLLER, AND METHOD OF CONTROLLING VEHICLE

CROSS-REFERENCE TO RELATED APPLICATIONS

This application claims priority to and the benefit of Japanese Patent Application No. 2023-27431 filed on Feb. 24, 2023, the entire disclosure of which is incorporated herein by reference.

BACKGROUND OF THE INVENTION

Field of the Invention

The present disclosure relates to a controller of a vehicle, a vehicle including a controller, a method of controlling a vehicle.

Description of the Related Art

International Publication No. 2012/090569 discloses a technology of controlling a clutch actuator to adjust clutch transmitting torque for vehicle start. At the time of the vehicle start, a speed change, and the like, the vehicle travels in a half-engaged state in some cases. It is desired to improve traveling feeling when the vehicle travels in the half-engaged state.

SUMMARY OF THE INVENTION

An object of the present disclosure is to provide a controller of a vehicle, a vehicle including a controller, and a method of controlling a vehicle, each of which can improve traveling feeling when the vehicle travels in a half-engaged state.

A controller of a vehicle according to one aspect of the present disclosure is a controller of a vehicle including: a driving source that generates power; a driving wheel; a friction clutch that transmits torque corresponding to an engagement amount of the friction clutch and is located on a power transmitting path through which the power is transmitted between the driving source and the driving wheel; a clutch actuator that changes the engagement amount of the friction clutch; and an acceleration operation sensor that detects an acceleration operation amount. The controller includes processing circuitry configured to: determine whether or not the friction clutch is in an engaged state; when it is determined that the friction clutch is not in the engaged state, control the clutch actuator such that the engagement amount of the friction clutch becomes a value corresponding to the acceleration operation amount received from the acceleration operation sensor; and control the driving source such that output torque of the driving source becomes a value corresponding to the engagement amount or a value corresponding to a parameter corresponding to the engagement amount.

A vehicle according to one aspect of the present disclosure includes: the driving source; the driving wheel; the friction clutch; the clutch actuator; the acceleration operation sensor; and the controller.

A method of controlling a vehicle according to one aspect of the present disclosure is a method of controlling a vehicle including: a driving source; a driving wheel; a friction clutch that transmits torque corresponding to an engagement amount of the friction clutch and is located on a power transmitting path through which power is transmitted between the driving source and the driving wheel; and a clutch actuator that changes the engagement amount of the friction clutch. The method includes: determining whether or not the friction clutch is in an engaged state; when it is determined that the friction clutch is not in the engaged state, controlling the clutch actuator such that the engagement amount of the friction clutch becomes a value corresponding to an acceleration operation amount of a rider; and controlling the driving source such that output torque of the driving source becomes a value corresponding to the engagement amount or a value corresponding to a parameter corresponding to the engagement amount.

The above object, other objects, features, and advantages of the present disclosure will be made clear by the following detailed explanation of preferred embodiments with reference to the attached drawings.

DETAILED DESCRIPTION

Hereinafter, an embodiment will be described with reference to the drawings.

Configuration of Vehicle

Figure 1:
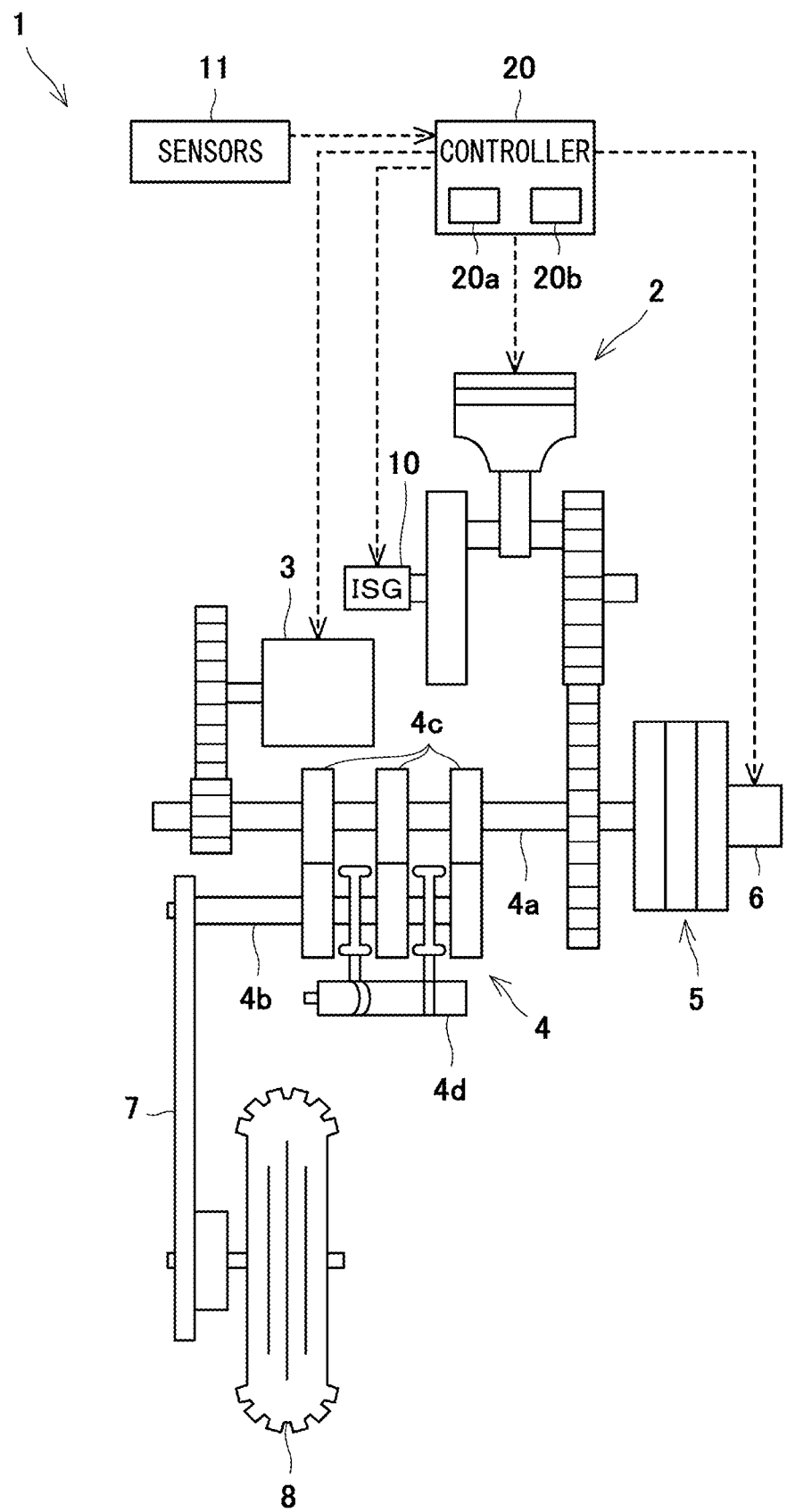
FIG. 1 is a schematic diagram of a vehicle according to one embodiment.

FIG. 1 is a schematic diagram of a vehicle 1 according to one embodiment. In the present embodiment, the vehicle 1 is a motorcycle including: a rear wheel that is a driving wheel 8; and a front wheel (not shown) that is a driven wheel. The vehicle 1 may be a three-wheeled vehicle or a four-wheeled vehicle.

The vehicle 1 described in the present embodiment is a hybrid vehicle. As two traveling driving sources that generate torque by which the driving wheel 8 is driven, the vehicle 1 includes an internal combustion engine (hereinafter referred to as an "engine") 2 and an electric motor 3. In addition, the vehicle 1 includes a transmission 4, a friction clutch 5, a clutch actuator 6, an output transmitting structure 7, the driving wheel 8, a starter motor 10, sensors 11, and a controller 20.

The transmission 4 changes the speed of rotational power output from the traveling driving source. In the present embodiment, the transmission 4 is a dog clutch transmission. The transmission 4 includes an input shaft 4a, an output shaft 4b, transmission gear pairs 4c having different change gear ratios, and a gear shifter 4d. The input shaft 4a and the output shaft 4b are parallel to each other. The transmission gear pair 4c includes two transmission gears which are respectively supported by the input shaft 4a and the output shaft 4b and mesh with each other.

The gear shifter 4d selects one of the transmission gear pairs 4c by a shift operation performed by a rider with respect to a shift operator included in the vehicle 1. In the transmission 4, the selected transmission gear pair 4c can transmit the power between the input shaft 4a and the output shaft 4b. The gear shifter 4d may select one transmission gear pair in electrical association with the shift operation performed by the rider or may select one transmission gear pair in mechanical association with the shift operation performed by the rider. For example, the shift operator may be a shift pedal operated by a foot of the rider or a shift switch located at, for example, a grip of a handlebar of the vehicle 1. A present gear stage is detected by a below-described gear position sensor. The transmission 4 does not have to be the dog clutch transmission and may be, for example, a continuously variable transmission.

The friction clutch 5 is located on a power transmitting path through which the power is transmitted between the engine 2 and the driving wheel 8. In the following description, the friction clutch 5 may be simply referred to as a clutch 5. The friction clutch 5 includes a pair of contact members that can contact each other and separate from each other. The rotational power is transmitted from one of the contact members to the other by frictional force between the pair of contact members. One of the pair of contact members is a rotating body located close to the engine 2, and the other is a rotating body located close to the input shaft 4a. The pair of contact members may be called a clutch plate and a friction plate. For example, the friction clutch 5 is a single disc clutch or a multiple disc clutch.

An engagement amount of the friction clutch 5 is changed by the clutch actuator 6. The engagement amount of the friction clutch 5 denotes pressing force (i.e., a pressing load) by which the pair of contact members of the friction clutch 5 are pressed against each other or denotes a parameter corresponding to this pressing force. The friction clutch 5 can transmit torque corresponding to the engagement amount by the frictional force. As the engagement amount of the friction clutch 5 increases, the torque that can be transmitted by the friction clutch 5 increases, i.e., friction torque increases.

The friction clutch 5 becomes a disengaged state, an engaged state, or a half-engaged state in accordance with the engagement amount of the friction clutch 5. The disengaged state of the friction clutch 5 denotes a state where the power is not transmitted between the engine 2 and the input shaft 4a. The engaged state of the friction clutch 5 denotes a state where the rotational power is transmitted without causing slipping between the pair of contact members. The friction clutch 5 changes from the disengaged state to the engaged state through the half-engaged state. The half-engaged state of the friction clutch 5 denotes a state where the rotational power is transmitted while causing the slipping between the pair of contact members. In other words, the half-engaged state of the friction clutch 5 denotes a state where the power is partially transmitted between the engine 2 and the input shaft 4a.

The clutch actuator 6 changes the engagement amount of the friction clutch 5. To be specific, the clutch actuator 6 changes the torque that can be transmitted by the friction clutch 5. In the present embodiment, the clutch actuator 6 is a hydraulic actuator. The clutch actuator 6 includes a hydraulic chamber, a piston, and a solenoid valve. The piston is driven by hydraulic pressure of the hydraulic chamber. The solenoid valve adjusts the hydraulic pressure of the hydraulic chamber. The hydraulic pressure of the clutch 5 changes in accordance with the value of a current supplied to the solenoid valve. For example, when the hydraulic pressure is preset open corresponding pressure, the clutch 5 becomes the disengaged state. When the hydraulic pressure is not less than engagement corresponding pressure, the clutch 5 becomes the engaged state. When the hydraulic pressure is pressure between the open corresponding pressure and the engagement corresponding pressure, the clutch 5 becomes the half-engaged state. There is a correlation among the engagement amount of the clutch 5, a parameter corresponding to the engagement amount of the clutch 5 (for example, the hydraulic pressure or the value of the current flowing through a solenoid of the solenoid valve), and the torque that can be transmitted by the friction clutch 5. Therefore, a below-described memory stores information indicating a correlation between the engagement amount of the clutch 5 and the torque that can be transmitted by the friction clutch 5 or between the parameter corresponding to the engagement amount of the clutch 5 and the torque that can be transmitted by the friction clutch 5. The torque that can be transmitted by the friction clutch 5 can be controlled by controlling the engagement amount of the clutch 5 or the parameter corresponding to the engagement amount of the clutch 5.

The output transmitting structure 7 is a structure through which the rotational power output from the output shaft 4b of the transmission 4 is transmitted to the driving wheel 8. The output transmitting structure 7 is, for example, a drive chain, a drive belt, a drive shaft, or the like.

At the start of the engine 2, the starter motor 10 gives the rotational power to a crank shaft of the engine 2 to drive the engine 2. The starter motor 10 is attached to one end portion of the crank shaft of the engine 2. In the present embodiment, the starter motor 10 is, for example, an integrated starter generator (ISG). To be specific, the starter motor 10 can drive the engine 2 at the start of the engine 2 and can generate electric power by being driven by the engine 2. However, the starter motor 10 does not have to be the ISG and may be a motor that has a function of driving the engine 2 at the start of the engine 2.

The vehicle 1 includes the sensors 11. For simplicity, in FIG. 1, the sensors are shown by a single block. The sensors 11 include an acceleration operation amount sensor, an engine rotational frequency sensor, a motor rotational frequency sensor, a gear position sensor, an input rotational frequency sensor, and the like. The acceleration operation amount sensor detects an accelerator opening degree that is an acceleration operation amount of the rider. The engine rotational frequency sensor detects the rotational frequency of an output shaft of the engine 2. The motor rotational frequency sensor detects the rotational frequency of the electric motor 3 at the time of the output. The gear position sensor detects the change gear ratio corresponding to the present gear stage of the transmission 4. The input rotational frequency sensor detects the rotational frequency (hereinafter referred to as an "input rotational frequency") of the input shaft 4a. Moreover, the sensors 11 may include a sensor that detects the shift operation performed by the rider, i.e., a speed change command. In this case, the sensor detects the speed change command output from the shift switch to which the rider inputs a shift-up operation or a shift-down operation.

The sensors 11 include a clutch sensor that detects a physical quantity corresponding to the engagement amount of the clutch 5. In the present embodiment, the sensors 11 include a current sensor that detects, as the physical quantity corresponding to the engagement amount of the clutch 5, the value of a current flowing through the solenoid of the solenoid valve that controls the hydraulic pressure of the clutch actuator 6. Since there is a correlation between the detected value of the clutch sensor and the torque that can be transmitted by the friction clutch 5, the torque that can be transmitted by the friction clutch 5 can be recognized from the detected value of the clutch sensor.

The controller 20 receives information detected by the sensors 11 and controls the engine 2, the electric motor 3, the clutch actuator 6, and the starter motor 10 based on the received information. The controller 20 may be a single control unit or may be control units located in a distributed manner. The controller 20 includes at least one CPU 20a, at least one memory 20b, an I/O interface, and the like in terms of hardware. The at least one memory 20b includes a volatile memory and a non-volatile memory. The CPU 20a is one example of processing circuitry.

The CPU 20a executes control corresponding to the state of the vehicle 1 with respect to the engine 2, the electric motor 3, and the clutch actuator 6. The CPU 20a determines the state of the vehicle 1 based on, for example, the information detected by the sensors 11.

For example, the state of the vehicle 1 includes a present traveling mode. For example, in the present embodiment, the vehicle 1 can switch the traveling mode between an EV mode and a HEV mode. The CPU 20a recognizes the present state of the vehicle 1 based on, for example, the values detected by the sensors 11 and determines the optimal traveling mode from the EV mode and the HEV mode.

The EV mode is a mode in which the traveling of the vehicle 1 does not require the driving of the engine 2. For example, in the EV mode, the driving wheel 8 is driven only by the power generated by the electric motor 3. In the EV mode, the friction clutch 5 is set to the disengaged state such that the engine 2 does not become resistance during the driving of the electric motor 3.

The HEV mode is a mode in which the driving wheel 8 is driven by at least the power generated by the engine 2. In the HEV mode, the driving wheel 8 is driven by both of the power generated by the engine 2 and the power generated by the electric motor 3. Moreover, for example, in the HEV mode, the engine 2 may be driven without driving the electric motor 3, and the driving wheel 8 may be driven only by the rotational power of the engine 2.

Moreover, examples of the state of the vehicle 1 in the HEV mode include: a normal traveling state where the vehicle 1 travels with the clutch 5 in the engaged state; and a vehicle start accelerating state where the vehicle 1 starts and accelerates with the clutch 5 in the half-engaged state. A period in which the state of the vehicle 1 is the vehicle start accelerating state is a transition period in which the clutch 5 changes from the disengaged state or the half-engaged state to the engaged state by increasing the engagement amount of the clutch 5.

The CPU 20a changes the torque required with respect to the engine 2 and the torque required with respect to the electric motor 3 in accordance with the state of the vehicle 1. A method of determining the required torque will be described with reference to FIG. 2.

Method of Determining Required Torque

Figure 2:
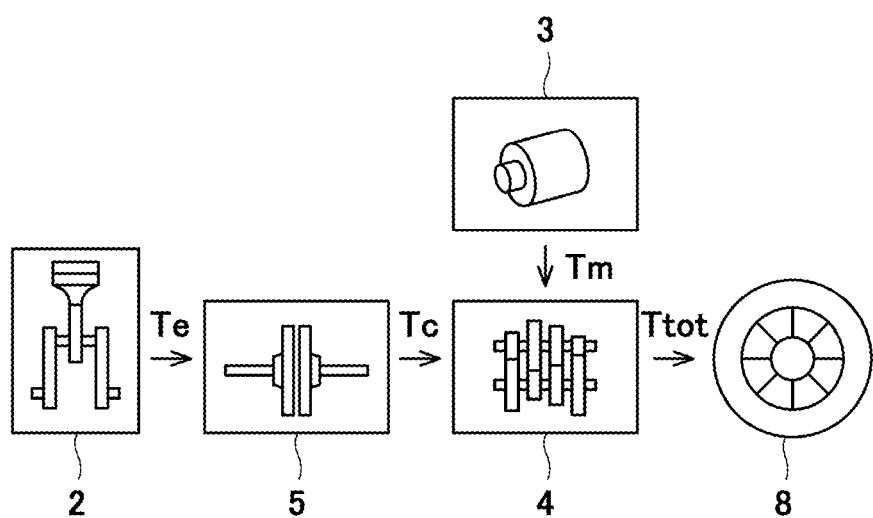
FIG. 2 is a schematic diagram for explaining a method of determining various types of required torque.

FIG. 2 is a schematic diagram for explaining the method of determining various types of required torque. When the clutch 5 is in the engaged state or the half-engaged state, the power of the engine 2 can be transmitted through the clutch 5 to the input shaft 4a of the transmission 4. Moreover, the power of the electric motor 3 can be transmitted to the input shaft 4a of the transmission 4.

The CPU 20a calculates rider required torque Ttot based on the acceleration operation amount of the rider. Moreover, the CPU 20a distributes the rider required torque Ttot at a predetermined distribution rate to determine torque (hereinafter referred to as "clutch required torque") Tc required as torque transmitted from the clutch 5 to the input shaft 4a and torque (hereinafter referred to as "motor required torque") Tm required as torque transmitted from the electric motor 3 to the input shaft 4a. To be specific, the total of the motor required torque Tm and the clutch required torque Tc is equal to the rider required torque Ttot. Therefore, Formula (1) is established by the rider required torque Ttot, the clutch required torque Tc, and the motor required torque Tm.

$$i. \text{Ttot} = Tc + Tm \tag{1}$$

The distribution rate is a value corresponding to the state of the vehicle 1. To be specific, the clutch required torque Tc and the motor required torque Tm are values corresponding to the state of the vehicle 1. For example, when the traveling mode is the EV mode, the clutch required torque Tc is zero, and the motor required torque Tm is set to the rider required torque Ttot corresponding to the acceleration operation amount.

For example, when the state of the vehicle 1 is a state where the vehicle 1 is traveling in the HEV mode, 100% of the rider required torque Ttot is determined to be basically generated by the engine 2. To be specific, the clutch required torque Tc is set to the rider required torque Ttot corresponding to the acceleration operation amount, and the motor required torque Tm is set so as to compensate the shortage of the transmitting torque from the clutch 5 which is caused by, for example, a sudden change in the rider required torque Ttot.

The distribution rate is not especially limited. The distribution rate may be changed depending on, for example, the state of the vehicle 1. Examples of the traveling state in the HEV mode may include: the above-described normal traveling state where 100% of the rider required torque Ttot is basically generated by the engine 2; and in addition, an electric power generation traveling state. The electric power generation traveling state is a state where the vehicle 1 travels while the electric motor 3 generates electric power. In the electric power generation traveling state, the electric motor 3 is required to generate negative torque, and the engine 2 is required to generate torque necessary for the traveling of the vehicle 1, and in addition, torque that cancels the negative torque generated by the electric motor 3. To be specific, the motor required torque Tm may be a negative value.

Moreover, a method of determining torque (hereinafter referred to as "engine required torque") Te to be output by the engine 2 differs depending on the state of the vehicle 1. For example, when the friction clutch 5 is in the engaged state, the engine required torque Te is set to the same value as the clutch required torque Tc. To be specific, when the friction clutch 5 is in the engaged state, all the output torque of the engine 2 is transmitted through the friction clutch 5 to the input shaft 4a. Therefore, the output of the engine 2 is controlled such that the torque transmitted from the clutch 5 to the input shaft 4a becomes the clutch required torque Tc.

When the friction clutch 5 is in the disengaged state, the clutch required torque Tc is zero regardless of the engine required torque Te. When the friction clutch 5 is in the disengaged state in, for example, the EV mode, the engine required torque Te is basically zero as with the clutch required torque Tc, and the engine 2 is in the stop state. However, for example, in the EV mode, the engine 2 may drive at a low load to warm up. In such a case, even when the friction clutch 5 is in the disengaged state, the engine required torque Te may become a value larger than zero.

When the friction clutch 5 is in the half-engaged state, the torque transmitted from the clutch 5 to the input shaft 4a increases as the engagement amount of the clutch 5 increases. In other words, the torque transmitted from the clutch 5 to the input shaft 4a can be controlled by controlling the engagement amount of the clutch 5 (in the present embodiment, the above-described hydraulic pressure of the clutch actuator 6). In the present embodiment, when the friction clutch 5 is in the half-engaged state, the torque transmitted from the clutch 5 to the input shaft 4a is adjusted to the clutch required torque Tc by changing the engagement amount of the clutch 5, whereas the output torque of the engine 2 is adjusted to a value corresponding to the engagement amount of the clutch 5. Specifically, when the friction clutch 5 is in the half-engaged state, the engine required torque Te is set to not less than the clutch required torque Tc (Te≥Tc) to prevent engine stall. A method of determining the engine required torque Te when the friction clutch 5 is in the half-engaged state will be described later in detail.

Control System

Figure 3:
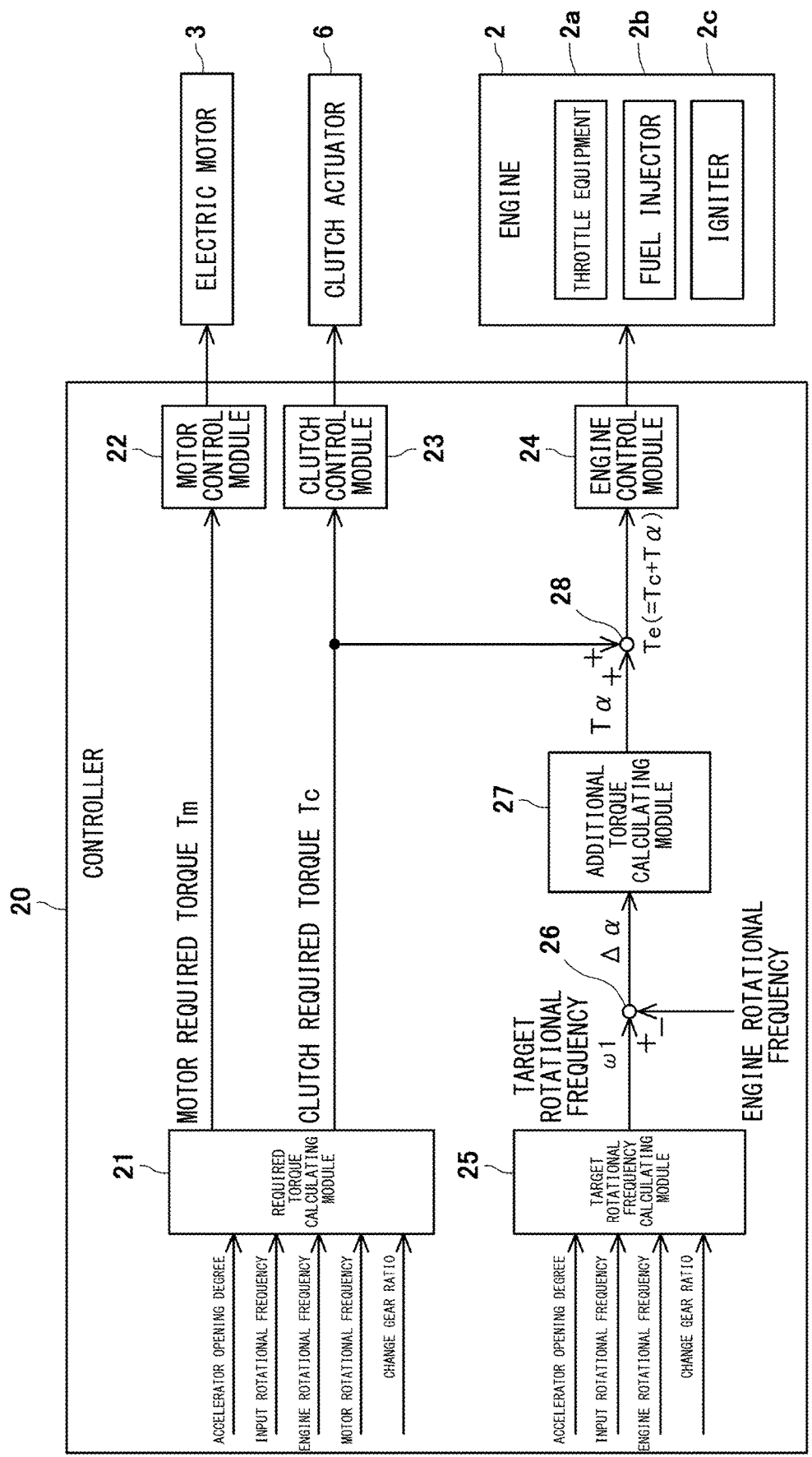
FIG. 3 is a block diagram showing a controller and its inputs and outputs.

FIG. 3 is a block diagram showing the controller 20 and its inputs and outputs. As shown in FIG. 3, the controller 20 includes a required torque calculating module 21, a motor control module 22, a clutch control module 23, an engine control module 24, a target rotational frequency calculating module 25, a subtracting module 26, an additional torque calculating module 27, and an adding module 28 in terms of function. The required torque calculating module 21, the motor control module 22, the clutch control module 23, the engine control module 24, the target rotational frequency calculating module 25, the subtracting module 26, the additional torque calculating module 27, and the adding module 28 are configured as functional blocks realized in such a manner that the CPU 20a performs calculation processing based on a program stored in the memory 20b.

The required torque calculating module 21 calculates the rider required torque Ttot, the clutch required torque Tc, and the motor required torque Tm. Specifically, the required torque calculating module 21 calculates the rider required torque Ttot based on the acceleration operation amount. Moreover, the required torque calculating module 21 determines the state of the vehicle 1 and calculates the clutch required torque Tc and the motor required torque Tm by distributing the rider required torque Ttot at the distribution rate corresponding to the result of the determination.

The motor control module 22 sends a command value to the electric motor 3 such that the electric motor 3 outputs the motor required torque Tm calculated by the required torque calculating module 21.

The clutch control module 23 controls the clutch actuator 6 in accordance with the state of the vehicle 1. For example, when it is determined that the traveling mode is the EV mode, the clutch control module 23 controls the clutch actuator 6 such that the clutch 5 becomes the disengaged state. For example, when it is determined that the state of the vehicle 1 is the traveling state that utilizes the driving of the engine 2, the clutch control module 23 controls the clutch actuator 6 such that the clutch 5 is set to the engaged state or is maintained in the engaged state.

For example, when the state of the vehicle 1 is the vehicle start accelerating state that uses the driving of the engine 2, the clutch control module 23 controls the clutch actuator 6 such that the state of the clutch 5 changes from the disengaged state or the half-engaged state to the engaged state. Moreover, when the state of the vehicle 1 is the vehicle start accelerating state that uses the driving of the engine 2, the clutch control module 23 controls the clutch actuator 6 such that the engagement amount of the clutch 5 becomes a value corresponding to the clutch required torque Tc based on the acceleration operation amount. More specifically, when the state of the vehicle 1 is the vehicle start accelerating state that uses the driving of the engine 2, the clutch control module 23 controls the clutch actuator 6 such that the torque that can be transmitted by the friction clutch 5 becomes the clutch required torque Tc.

For example, in the present embodiment, when the state of the vehicle 1 is the vehicle start accelerating state that uses the driving of the engine 2, the rider required torque Ttot is set so as to gradually increase with time by an acceleration operation of the rider. To be specific, the clutch required torque Tc is set so as to gradually increase with time. The clutch control module 23 controls the clutch actuator 6 such that the engagement amount of the clutch 5 increases as the clutch required torque Tc increases. For example, the clutch required torque Tc may be set such that as the acceleration operation amount increases, an increase amount of the clutch required torque Tc per unit time increases. For example, the clutch required torque Tc may be set such that as the time change of the acceleration operation amount increases, the increase amount of the clutch required torque Tc per unit time increases. The memory 20b prestores a map showing a correspondence relation between the clutch required torque Tc and at least one of the acceleration operation amount and the time change of the acceleration operation amount. The required torque calculating module 21 refers to the correspondence relation and determines the clutch required torque Tc corresponding to the acceleration operation amount.

The clutch required torque Tc when the state of the vehicle 1 is the vehicle start accelerating state that uses the driving of the engine 2 is set in accordance with the acceleration operation amount of the rider. Thus, the traveling speed can be made to approach a target traveling speed set in consideration of an acceleration requirement of the rider. For example, the clutch required torque Tc when the acceleration operation amount or the time change of the acceleration operation amount is large is made larger than that when the acceleration operation amount or the time change of the acceleration operation amount is small. Thus, the traveling speed is made to easily approach the target traveling speed corresponding to the acceleration requirement of the rider.

Moreover, the clutch required torque Tc in the vehicle start accelerating state that utilizes the driving of the engine 2 may be set in consideration of information correlated to the traveling speed in addition to the acceleration operation amount. Examples of the information correlated to the traveling speed include the input rotational frequency, the engine rotational frequency, the motor rotational frequency, and the change gear ratio. Since the clutch required torque Tc is set in consideration of the information correlated to the traveling speed, the traveling speed can be made to approach the target traveling speed set in consideration of the present traveling speed. For example, the increase amount of the clutch required torque Tc when the present traveling speed is low is made larger than that when the present traveling speed is high. In contrast, the increase amount of the clutch required torque Tc when the present traveling speed is high is made smaller than that when the present traveling speed is low. Since the clutch required torque Tc is set in accordance with the present traveling speed as above, acceleration feeling desired by the rider is easily obtained.

Moreover, the clutch required torque Tc may be set based on the speed change command or a braking command in addition to the acceleration operation amount. Since the clutch required torque Tc is set based on the speed change command or the braking command, the traveling speed can be made to further approach the target traveling speed desired by the rider, and the traveling feeling corresponding to the intention of the rider is easily obtained.

The setting of the clutch required torque Tc may correspond to predetermined various modes. For example, when an output prioritized mode in which the acceleration requirement is prioritized and an economy mode in which the extension of a traveling continuation distance is prioritized are selectively executed as the control mode of the controller 20, the clutch required torque Tc set when the output prioritized mode is being selected and the clutch required torque Tc set when the economy mode is being selected may be made different from each other. As above, the required torque calculating module 21 sets the clutch required torque Tc based on the operation amount of the rider, the state of the vehicle 1, the selected control mode, and the like such that the feeling desired by the rider is obtained. The required torque calculating module 21 may calculate the clutch required torque Tc based on a formula including the input information as a variable.

The engine control module 24 controls the engine 2 based on the engine required torque Te. To be specific, the engine control module 24 determines a throttle opening degree command value, a fuel injection signal, and an engine ignition signal based on the engine required torque Te and outputs the throttle opening degree command value, the fuel injection signal, and the engine ignition signal respectively to throttle equipment 2a, a fuel injector 2b, and an igniter 2c of the engine 2.

A method of setting the engine required torque Te differs depending on whether or not the clutch 5 is in the engaged state. For example, the method of setting the engine required torque Te differs depending on whether or not the state of the vehicle 1 is the vehicle start accelerating state that uses the driving of the engine 2. When the state of the vehicle 1 is not the vehicle start accelerating state that uses the driving of the engine 2, the engine required torque Te is set to the clutch required torque Tc. When the state of the vehicle 1 is the vehicle start accelerating state that uses the driving of the engine 2, the engine required torque Te is set to torque obtained by adding below-described additional torque $T\alpha$ to the clutch required torque Tc.

The target rotational frequency calculating module 25, the subtracting module 26, the additional torque calculating module 27, and the adding module 28 are related to the generation of the engine required torque Te when the state of the vehicle 1 is the vehicle start accelerating state that uses the driving of the engine 2, more specifically, the generation of the additional torque $T\alpha$. The additional torque $T\alpha$ is torque necessary to make the rotational frequency of the engine 2 reach a target rotational frequency $\omega 1$. More specifically, the additional torque $T\alpha$ is torque additionally necessary for the clutch required torque Tc to increase the engine rotational frequency to the target rotational frequency $\omega 1$. The additional torque $T\alpha$ may also be referred to as rotational frequency control torque.

The target rotational frequency calculating module 25 determines the target rotational frequency $\omega 1$ of the engine 2 based on the acceleration operation amount, the input rotational frequency, the engine rotational frequency, the motor rotational frequency, the change gear ratio, the speed change command, and the deceleration command. The target rotational frequency $\omega 1$ is a value set as the target value of the engine rotational frequency while the friction clutch 5 is in the half-engaged state. For example, the target rotational frequency $\omega 1$ is set so as to increase as the acceleration operation amount of the rider increases. The memory 20b prestores a map showing a correspondence relation between the acceleration operation amount (in the present embodiment, the accelerator opening degree) and the target rotational frequency $\omega 1$. The target rotational frequency calculating module 25 refers to the correspondence relation and determines the target rotational frequency $\omega 1$ of the engine 2 which corresponds to the acceleration operation amount.

Since the target rotational frequency $\omega 1$ is set in accordance with the acceleration operation amount of the rider, the engine rotational frequency can be made to approach a value corresponding to a torque increase set in consideration of the acceleration requirement of the rider. For example, the target rotational frequency $\omega 1$ when the acceleration operation amount or the time change of the acceleration operation amount is large is made larger than the target rotational frequency $\omega 1$ when the acceleration operation amount or the time change of the acceleration operation amount is small. Thus, the engine rotational frequency is made to easily approach the engine rotational frequency corresponding to the acceleration requirement of the rider.

Moreover, the target rotational frequency $\omega 1$ may be set in consideration of the information correlated to the traveling speed. Since the target rotational frequency $\omega 1$ is set in consideration of the information correlated to the traveling speed, the engine rotational frequency can be made to approach a value set in consideration of the present traveling speed. For example, when increasing the target rotational frequency $\omega 1$ upon reception of a certain acceleration operation amount, the increase amount of the target rotational frequency $\omega 1$ when the present traveling speed is low is made larger than that when the present traveling speed is high. This is because it is assumed that when the traveling speed is low, the rider intends to further accelerate the vehicle 1. In contrast, the increase amount of the target rotational frequency $\omega 1$ when the present traveling speed is high is made smaller than that when the present traveling speed is low. As above, since the target rotational frequency $\omega 1$ is set in accordance with the present traveling speed, the acceleration feeling desired by the rider can be easily obtained.

Moreover, the target rotational frequency $\omega 1$ when the state of the vehicle 1 is the vehicle start accelerating state that utilizes the driving of the engine 2 may correspond to predetermined various modes. For example, when the output prioritized mode in which the acceleration requirement is prioritized and the economy mode in which the extension of the traveling continuation distance is prioritized are selectively executed as the control mode of the controller 20, the target rotational frequency $\omega 1$ when the output prioritized mode is being selected and the target rotational frequency $\omega 1$ when the economy mode is being selected may be made different from each other. As above, the target rotational frequency calculating module 25 sets the target rotational frequency $\omega 1$ based on the operation amount of the rider, the state of the vehicle 1, the selected control mode, and the like such that the feeling desired by the rider is obtained. The target rotational frequency calculating module 25 may calculate the target rotational frequency ω1 based on a formula including the input information as a variable. The target rotational frequency calculating module 25 may calculate the target rotational frequency ω1 based on an n-dimensional map that derives the target rotational frequency ω1 from the input information.

The target rotational frequency ω1 may be set to a rotational frequency range in which the stall does not occur. For example, the target rotational frequency ω1 may be set to such a rotational frequency that minimum torque that can prevent the occurrence of the stall can be output. For example, the target rotational frequency ω1 may set so as to be larger than an idle rotational frequency ω0 of the engine 2.

The subtracting module 26 calculates a rotational frequency difference Δα by subtracting an actual engine rotational frequency, which is detected by the engine rotational frequency sensor, from the determined target rotational frequency ω1 of the engine 2.

The additional torque calculating module 27 calculates the additional torque Tα based on the calculated rotational frequency difference Δα. For example, torque necessary to obtain the rotational frequency difference Δα is calculated as the additional torque Tα. The additional torque Tα is set so as to increase as the rotational frequency difference Δα increases. The memory 20b prestores a conversion map showing a correspondence relation between the rotational frequency difference Δα and the additional torque Tα. The additional torque calculating module 27 calculates the additional torque Tα from the rotational frequency difference Δα by using the conversion map.

The adding module 28 calculates the engine required torque Te, which is torque to be output from the engine 2, by adding the additional torque Tα to the clutch required torque Tc. The engine control module 24 sends a command value to the engine 2 such that the engine 2 outputs the calculated engine required torque Te.

Even when the engine required torque Te is torque obtained by adding the additional torque Tα to the clutch required torque Tc, the torque transmitted from the clutch 5 to the input shaft 4a is torque that is the same in value as the clutch required torque Tc. This is because the clutch actuator 6 is controlled such that the torque that can be transmitted by the friction clutch 5 becomes the clutch required torque Tc. The additional torque Tα is consumed by the friction clutch 5 as a slipping component. The engine required torque Te is set to be higher than the clutch required torque Tc by the additional torque Tα. Therefore, even when the clutch required torque Tc is increased with time, the power set based on the clutch required torque Tc can be transmitted to the input shaft 4a while preventing the engine required torque Te from becoming lower than the clutch required torque Tc. As described above, the engine required torque Te is set to be higher than the clutch required torque Tc by the additional torque Tα. Therefore, for example, even when the responsiveness of the engine 2 is low, the responsiveness of the torque transmitted from the clutch 5 to the input shaft 4a with respect to the clutch required torque Tc can be improved while preventing the engine stall.

Figure 4:
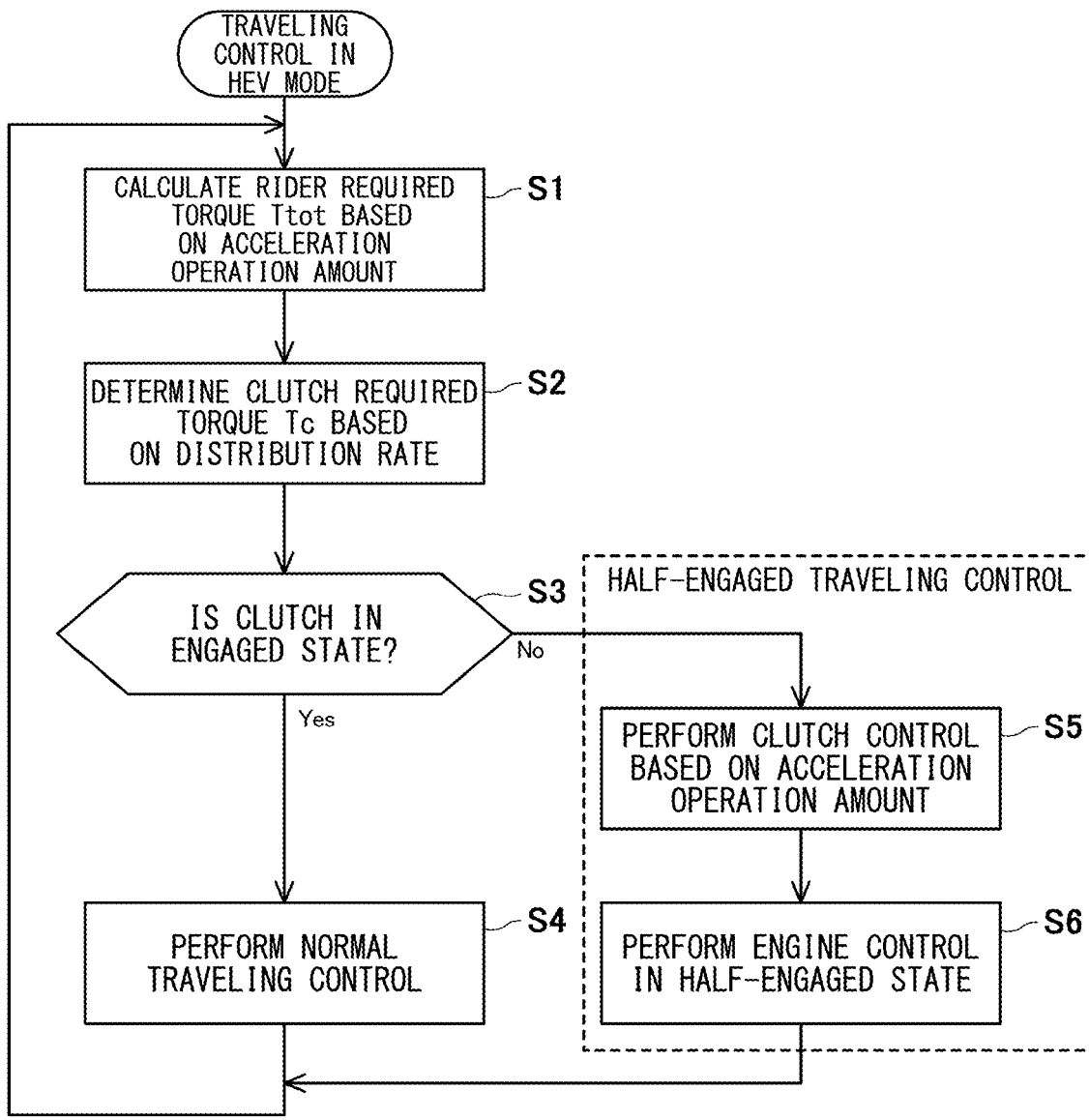
FIG. 4 is a flowchart showing the flow of traveling control in a HEV mode.

Next, the flow of the traveling control of the vehicle 1 in the HEV mode will be described with reference to FIG. 4. When the clutch 5 is in the half-engaged state, such as when the vehicle 1 is in a vehicle start state, below-described half-engaged traveling control is executed as the traveling control of the vehicle 1 in the HEV mode.

The CPU 20a (more specifically, the required torque calculating module 21) acquires the acceleration operation amount detected by the acceleration operation amount sensor and calculates the rider required torque Ttot based on the acceleration operation amount (Step S1).

Moreover, the CPU 20a (more specifically, the required torque calculating module 21) calculates the motor required torque Tm and the clutch required torque Tc by distributing the calculated rider required torque Ttot at the predetermined distribution rate (Step S2).

After Step S2, the CPU 20a determines whether or not the clutch 5 is in the engaged state (Step S3). Whether or not the clutch 5 is in the engaged state may be determined from a rotational frequency difference of the pair of contact members of the clutch 5. For example, it may be determined that when the rotational frequency difference is not more than a predetermined value, the clutch 5 is in the engaged state. For example, the rotational frequency difference of the pair of contact members of the clutch 5 is obtained as a difference of values obtained by converting the rotational frequency detected by the engine rotational frequency sensor and the rotational frequency detected by the input rotational frequency sensor into the rotational frequencies of the pair of contact members.

In Step S3, the CPU 20a may determine whether or not the state of the vehicle 1 is the predetermined vehicle start accelerating state. The vehicle start accelerating state is one of the states in which the vehicle 1 travels in the half-engaged state. The vehicle start accelerating state is a state where the clutch 5 is in the half-engaged state, and the vehicle 1 is accelerated by the power from the driving source (in the present embodiment, the engine 2) located upstream of the clutch 5. A judgment condition based on which it is determined that the state of the vehicle 1 is the vehicle start accelerating state may include a condition that the vehicle speed is not more than a predetermined value, in addition to a condition that the clutch 5 is not in the engaged state.

When it is determined that the clutch 5 is in the engaged state (Yes in Step S3), the CPU 20a executes normal traveling control (Step S4).

In the normal traveling control of the HEV mode, the engine 2 is controlled so as to output the clutch required torque Tc as the output torque. When the clutch 5 is in the engaged state, all the output torque of the engine 2 is basically transmitted through the friction clutch 5 to the input shaft 4a. Therefore, in the normal traveling control, the CPU 20a (more specifically, the engine control module 24) controls the engine 2 such that the engine 2 outputs the calculated clutch required torque Tc. In the present embodiment, the additional torque calculating module 27 outputs zero as the additional torque Tα.

When it is determined that the clutch 5 is not in the engaged state (No in Step S3), the CPU 20a executes the half-engaged traveling control (Steps S5 and S6). For example, at the time of the vehicle start acceleration and the speed change, the clutch 5 is not in the engaged state, and therefore, the half-engaged traveling control is executed.

For example, when the vehicle 1 starts and accelerates in the HEV mode, the power of the electric motor 3 is not utilized, and only the power of the engine 2 is utilized. To be specific, the motor required torque Tm is zero, and according to Formula (1) above, the clutch required torque Tc is equal to the rider required torque Ttot. In the half-engaged traveling control of the HEV mode, both of the engine 2 and the clutch actuator 6 are controlled such that the torque transmitted from the clutch 5 to the input shaft 4a becomes the clutch required torque Tc, in other words, the torque transmitted from the clutch 5 to the input shaft 4a becomes the rider required torque Ttot.

Specifically, in the half-engaged traveling control, the CPU 20a controls the clutch actuator 6 such that the engagement amount of the clutch 5 becomes a value corresponding to the acceleration operation amount (Step S5). For example, the CPU 20a controls the clutch actuator 6 based on the acceleration operation amount so as to change the engagement amount of the clutch 5.

More specifically, in the process of increasing the clutch engagement amount, the clutch control module 23 controls the clutch actuator 6 such that the torque that can be transmitted by the friction clutch 5 becomes the clutch required torque Tc. For example, the memory 20b prestores a map showing a correspondence relation between the value of the current flowing through the solenoid of the clutch actuator 6 and the clutch required torque Tc or between the value of the current flowing through the solenoid of the clutch actuator 6 and the torque that can be transmitted by the friction clutch 5. The clutch control module 23 controls the clutch actuator 6 such that the detected value of the current sensor that is the clutch sensor becomes the current value corresponding to the clutch required torque Tc.

Moreover, the CPU 20a controls the engine 2 such that the rotational frequency of the engine 2 is made to approach the target rotational frequency ω1, and the output torque of the engine 2 becomes a value corresponding to the engagement amount of the friction clutch 5 or a value corresponding to a parameter corresponding to the engagement amount of the friction clutch 5 (Step S6). For example, the parameter corresponding to the engagement amount of the friction clutch 5 is a parameter (for example, the hydraulic pressure of the clutch actuator 6 or the value of the current flowing through the solenoid) that indirectly shows the engagement amount of the friction clutch 5 or a parameter (in the present embodiment, the clutch required torque Tc) used to control the engagement amount of the clutch 5. For example, the CPU 20a controls the engine 2 such that the output torque of the engine 2 is changed in accordance with a change in the engagement amount of the clutch 5.

More specifically, the engine control module 24 sends a command value to the engine 2 such that the output torque of the engine 2 becomes the engine required torque Te obtained by adding the additional torque Tα to the clutch required torque Tc that is the parameter corresponding to the engagement amount. Formula (2) below is established by the engine required torque Te, the clutch required torque Tc, and the additional torque Tα.

$$i. Te=Tc+T\alpha \quad (2)$$

Therefore, as the clutch required torque Tc increases, the output torque of the engine 2 increases. To be specific, the CPU 20a controls the engine 2 such that as the engagement amount of the friction clutch 5 increases, the output torque of the engine 2 increases.

As above, while it is being determined in Step S3 that the friction clutch 5 is in the half-engaged state, the CPU 20a controls the engine 2 such that the output torque of the engine 2 becomes torque obtained by adding the rotational frequency control torque Tα to the clutch required torque Tc. Then, after it is determined that the state of the friction clutch 5 has been changed from the half-engaged state to the engaged state, the CPU 20a executes the normal traveling control and controls the engine 2 such that the output torque of the engine 2 becomes the clutch required torque Tc.

Operational advantages obtained when the engine required torque Te is set to the torque obtained by adding the additional torque Tα to the clutch required torque Tc in the half-engaged traveling control that utilizes the driving of the engine 2 will be described with reference to FIGS. 5 to 7.

Figure 5:
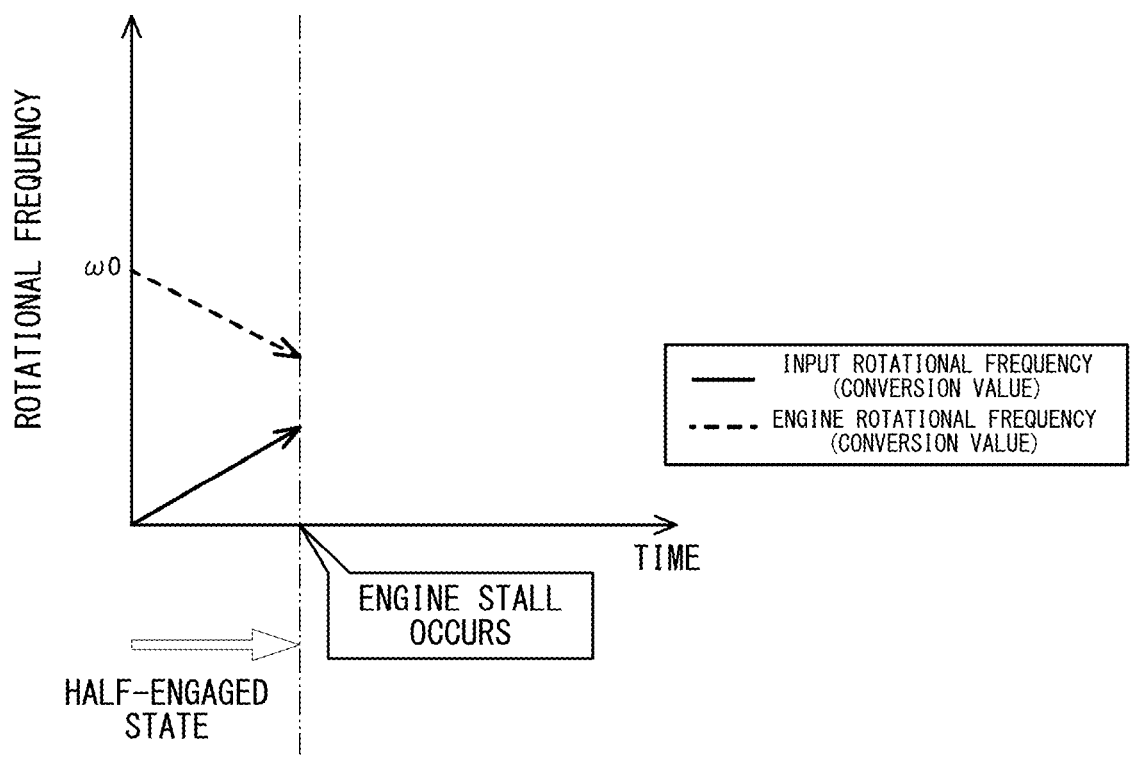
FIG. 5 is a graph showing one example of a time change of an input rotational frequency and a time change of an engine rotational frequency when engine required torque is smaller than clutch required torque.
Figure 6:
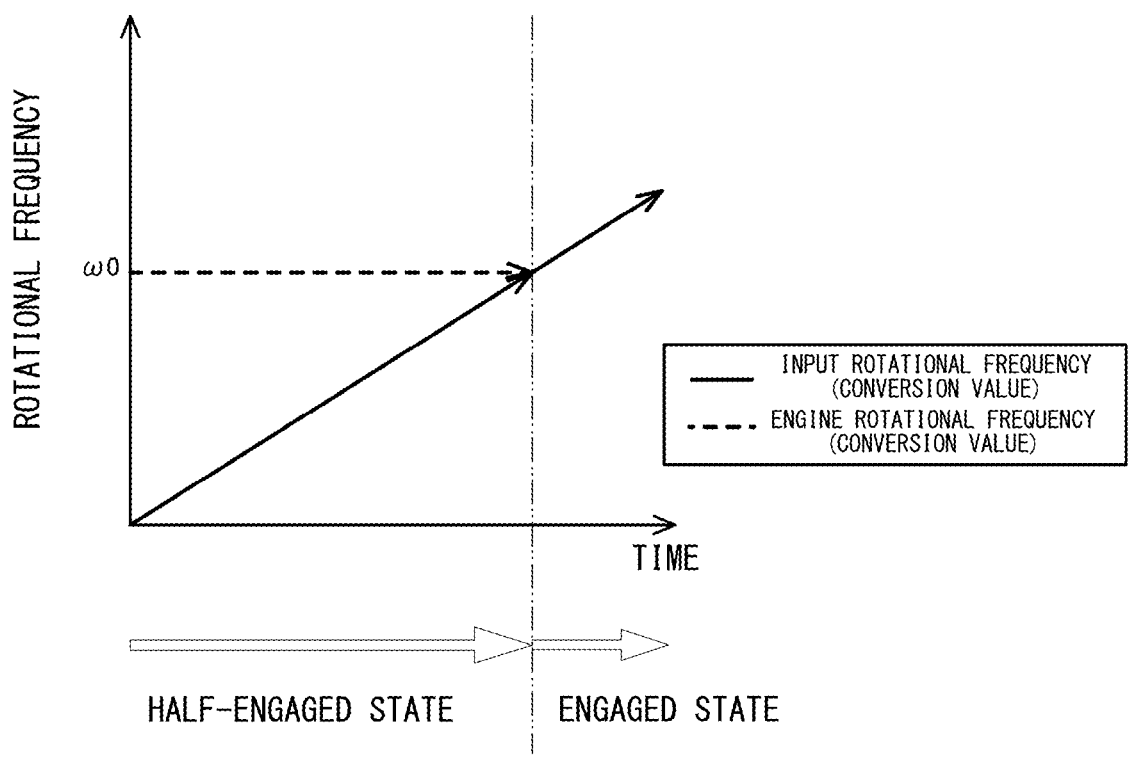
FIG. 6 is a graph showing one example of the time change of the input rotational frequency and the time change of the engine rotational frequency when the engine required torque is equal to the clutch required torque.
Figure 7:
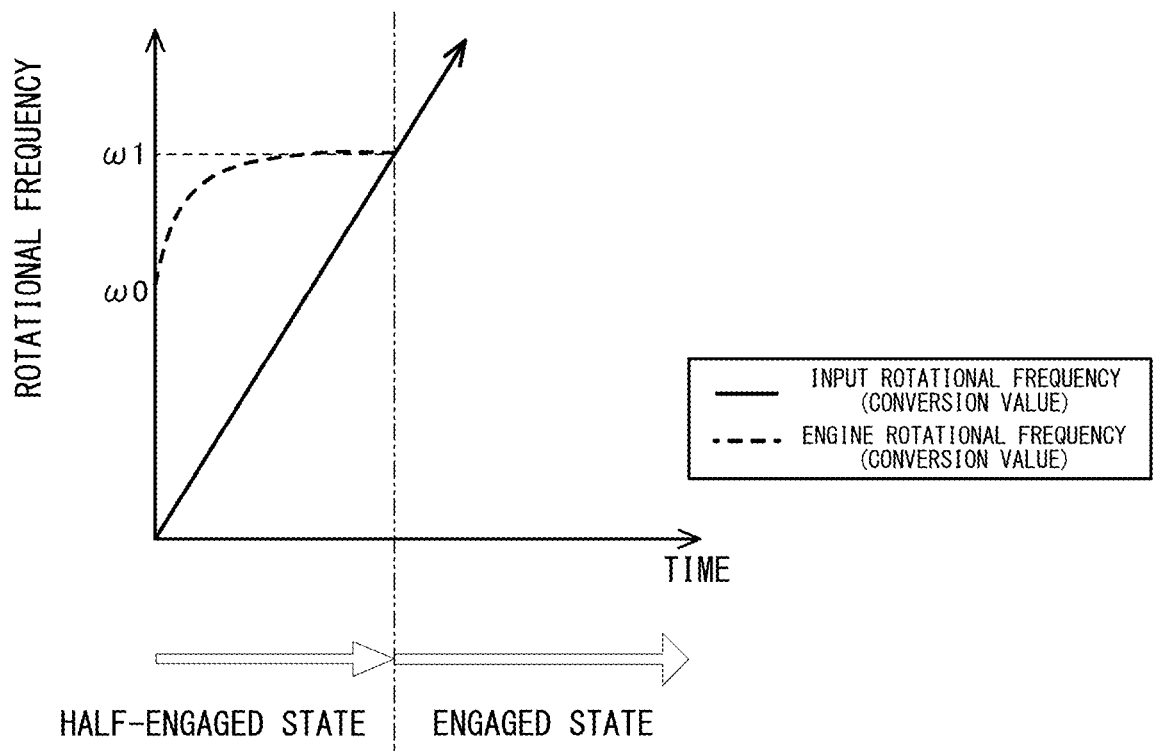
FIG. 7 is a graph showing one example of the time change of the input rotational frequency and the time change of the engine rotational frequency when the engine required torque is larger than the clutch required torque.

The graphs of FIGS. 5 to 7 show the time change of the engine rotational frequency and the time change of the input rotational frequency in a situation in which the vehicle 1 starts and accelerates as one example of a situation in which the half-engaged traveling control is executed. More specifically, the graphs of FIGS. 5 to 7 show the time change of the engine rotational frequency and the time change of the input rotational frequency when the vehicle 1 that is in a stop state with the engine 2 rotating at the idle rotational frequency ω0 is started and accelerated by the acceleration operation of the rider. In the graphs, a horizontal axis represents a time, and a vertical axis represents a rotational frequency. In the graphs of FIGS. 5 to 7, the input rotational frequency and the engine rotational frequency are values obtained by converting the actual input rotational frequency and the actual engine rotational frequency into rotational frequencies at a clutch shaft, i.e., the rotational frequencies of the pair of contact members of the clutch 5. While the clutch 5 is in the half-engaged state, the rotational frequency of the input shaft 4a increases with time by the torque transmitted from the driving source to the input shaft 4a in accordance with the acceleration operation of the rider.

The method of setting the engine required torque Te while the clutch 5 is in the half-engaged state differs among the graphs of FIGS. 5 to 7. Specifically, FIG. 5 shows the time change of the input rotational frequency and the time change of the engine rotational frequency when the engine required torque Te is set to be smaller than the clutch required torque Tc. FIG. 6 shows the time change of the input rotational frequency and the time change of the engine rotational frequency when the engine required torque Te is set to be equal to the clutch required torque Tc. FIG. 7 shows the time change of the input rotational frequency and the time change of the engine rotational frequency when the engine required torque Te is larger than the clutch required torque Tc, more specifically, when the engine required torque Te is set based on Formula (2) above.

In FIGS. 5 to 7, while the clutch 5 is in the half-engaged state, the torque transmitted from the clutch 5 to the input shaft 4a may be constant or may vary. In other words, while the clutch 5 is in the half-engaged state, the clutch required torque Tc required as the torque transmitted from the clutch 5 to the input shaft 4a may be constant or may vary. The clutch required torque Tc may be suitably set based on situations, such as the acceleration operation amount and the vehicle speed, and the clutch required torque Tc does not necessarily have to increase with time while the clutch 5 is in the half-engaged state. For example, when the acceleration operation amount is constant with time, the clutch required torque Tc may also be constant. The clutch required torque Tc may increase or decrease in accordance with the time change of the acceleration operation amount. For example, when the acceleration operation amount of the rider increases with time at the start of the vehicle 1, the clutch required torque Tc may also increase.

When the clutch 5 is in the half-engaged state, i.e., when the friction torque is being generated, the input rotational frequency (conversion value) and the engine rotational frequency (conversion value) approach each other with time without increasing the clutch required torque Tc. When there is no slipping of the clutch 5, i.e., when the clutch 5 is in the engaged state, the CPU 20a executes the above-described normal traveling control. To be specific, after the clutch 5 is set to the engaged state, the engine required torque Te is set to be equal to the clutch required torque Tc. For example, when the motor required torque Tm is zero, the engine required torque Te is set to be equal to the rider required torque Ttot.

As shown in FIG. 5, when the engine required torque Te is smaller than the clutch required torque Tc, the engine rotational frequency gradually decreases from the idle rotational frequency ω0. Such decrease in the engine rotational frequency increases a possibility of the occurrence of the engine stall. For example, as shown in FIG. 5, when the engine rotational frequency falls below a certain rotational frequency lower than the idle rotational frequency ω0, the engine stall occurs. Even when the engine rotational frequency decreases in a case where, for example, the engine rotational frequency at the start of the half-engaged traveling control is higher than the idle rotational frequency ω0, the clutch engagement may be achieved without the occurrence of the engine stall.

As shown in FIG. 6, when the engine required torque Te is equal to the clutch required torque Tc, the entire torque output from the engine 2 is transmitted through the clutch 5 to the input shaft 4*a*. To be specific, there is no remaining power that increases the engine rotational frequency, and the engine rotational frequency does not increase. Since the increase in the engine rotational frequency is suppressed as shown in FIG. 6, the engine rotational frequency is increased from the initial rotational frequency ω0 immediately after the clutch engagement. Therefore, as compared to when the engine rotational frequency immediately after the clutch engagement is the rotational frequency ω1 higher than the initial rotational frequency ω0 as shown in FIG. 7 described below, when the engine required torque Te is equal to the clutch required torque Tc, it takes time to increase the engine target rotational frequency after the clutch engagement, and the torque that can be output by the engine 2 is small due to the low engine rotational frequency.

As shown in FIG. 7, when the engine required torque Te is set to the torque obtained by adding the additional torque Tα to the clutch required torque Tc, the engine rotational frequency increases from the idle rotational frequency ω0 toward the target rotational frequency ω1. In FIG. 7, for ease of understanding, the target rotational frequency ω1 while the friction clutch 5 is in the half-engaged state is constant. However, while the friction clutch 5 is in the half-engaged state, the target rotational frequency ω1 may change in accordance with, for example, a change in the acceleration operation amount.

The engine required torque Te is set to torque obtained by adding the additional torque Tα to the clutch required torque Tc. Therefore, even when the clutch required torque Tc rapidly increases, the torque transmitted from the clutch 5 to the input shaft 4*a* can be made to follow the change in the clutch required torque Tc regardless of the low responsiveness of the engine 2. Moreover, the engine required torque Te is set to be larger than the clutch required torque Tc by the additional torque T. Therefore, even when the time change of the clutch required torque Tc is large, the output torque of the engine 2 can be prevented from becoming smaller than the clutch required torque Tc, and as a result, the occurrence of the engine stall can be suppressed.

Moreover, torque that is the difference between the engine required torque Te and the clutch required torque Tc is consumed as frictional heat at the clutch 5. To reduce the consumption of the clutch 5, it is desirable to avoid a case where the difference between the engine required torque Te and the clutch required torque Tc becomes excessive. In the present embodiment, since the additional torque Tα is set to a value corresponding to the target rotational frequency, the engine required torque Te can be prevented from becoming excessive.

Moreover, the engine rotational frequency immediately after the clutch engagement is the rotational frequency ω1 higher than the initial rotational frequency ω0. Therefore, the engine rotational frequency can be increased more quickly than when the engine target rotational frequency after the clutch engagement is the initial rotational frequency ω0. Thus, the acceleration feeling is easily obtained.

As described above, according to the present embodiment, the output torque of the engine 2 can be controlled in consideration of a load change caused by the clutch engagement. Therefore, the excess and shortage of the output torque of the engine 2 are suppressed, and the output torque against the load generated by the clutch engagement can be given. Since the excess and shortage of the output torque of the engine 2 are suppressed as above, the traveling feeling, such as vehicle start feeling and speed change feeling, can be improved.

Moreover, in the present embodiment, as the engagement amount of the friction clutch 5 increases, the output torque of the engine 2 increases. To be specific, as the torque that can be transmitted by the friction clutch 5 increases, the output torque of the engine 2 is made to increase. As a result, a decrease in the engine rotational frequency by the clutch engagement is suppressed, and the traveling feeling can be improved.

Moreover, in the present embodiment, the engine 2 is controlled such that the output torque of the engine 2 becomes larger than the clutch required torque Tc set in accordance with the acceleration operation amount. Therefore, the decrease in the rotational frequency of the engine 2 by the frictional force of the clutch 5 can be prevented, and the vehicle start acceleration corresponding to the acceleration operation is easily realized.

Moreover, in the present embodiment, the output torque of the engine 2 is obtained by adding the additional torque Tα, which corresponds to the target rotational frequency of the engine 2 and the actual engine rotational frequency, to the clutch required torque Tc. Therefore, the responsiveness of the engine 2 with respect to the target rotational frequency can be improved. Thus, a response time from when the rider performs the acceleration operation until when the engine 2 reaches the target rotational frequency can be shortened, and the driving feeling can be improved.

Moreover, in the present embodiment, a calculation logic of the output torque of the engine 2 is changed in accordance with whether or not the vehicle 1 is in the vehicle start accelerating state, more specifically, whether the friction clutch 5 is in the half-engaged state or the engaged state. While the friction clutch 5 is in the half-engaged state, the excess and shortage of the output torque of the engine 2 can be suppressed while maintaining the vehicle start acceleration. After the friction clutch 5 is set to the engaged state, the output torque of the engine 2 is made to coincide with the clutch required torque Tc. Thus, the driving feeling close to the operational feeling of the rider can be realized at the time of constant speed traveling, deceleration traveling, and the like.

Moreover, in the present embodiment, the target rotational frequency ω1 is set to increase as the acceleration operation amount increases. Therefore, the vehicle acceleration corresponding to the acceleration operation of the rider is easily obtained, and the traveling suitable for the vehicle start acceleration can be realized.

Moreover, according to the present embodiment, the change gear ratio of the transmission 4 is also used for the setting of the target rotational frequency $\omega 1$. Thus, the vehicle acceleration suitable for the change gear ratio of the transmission 4 is easily obtained, and the traveling suitable for the vehicle start acceleration can be realized.

Moreover, in the present embodiment, the target rotational frequency $\omega 1$ is set to be higher than the idle rotational frequency $\omega 0$ of the engine 2. Therefore, since the target rotational frequency $\omega 1$ can be increased from the idle rotational frequency $\omega 0$, the engine stall by the decrease in the engine rotational frequency can be suppressed.

Other Embodiments

The present disclosure is not limited to the above-described embodiment, and modifications, additions, and eliminations may be made with respect to the configuration of the embodiment.

For example, the vehicle described in the above embodiment is a hybrid vehicle including two traveling driving sources. However, the vehicle is not limited to this. For example, the vehicle may include only one traveling driving source or may include three or more traveling driving sources. The vehicle may include: a friction clutch located on a power transmitting path through which power is transmitted between at least one traveling driving source and a driving wheel; and a clutch actuator that changes an engagement amount of the friction clutch. The vehicle start acceleration control described in the above embodiment is applicable to the vehicle start acceleration control that utilizes the driving source located upstream of the friction clutch on the power transmitting path.

For example, the vehicle may include only an internal combustion engine as the traveling driving source. Moreover, for example, the vehicle may be an electric vehicle including only an electric motor as the traveling driving source. In this case, the electric vehicle includes: a friction clutch located on a power transmitting path through which power is transmitted between the electric motor that is the traveling driving source and a driving wheel; and a clutch actuator that changes an engagement amount of the friction clutch.

Moreover, in the above embodiment, the internal combustion engine is described as the driving source that generates the power transmitted to the driving wheel through the friction clutch. However, such driving source is not limited to the internal combustion engine. The driving source may be an external combustion engine, an electric motor, fluid machinery, or the like.

Moreover, in the above embodiment, the CPU 20a controls the engine 2 as the driving source such that as the engagement amount of the friction clutch 5 increases, the output torque of the engine 2 increases. However, the CPU 20a may control the driving source such that as the increase amount of the engagement amount of the friction clutch 5 per unit time increases, the output torque of the driving source increases.

Moreover, in the above embodiment, the target rotational frequency $\omega 1$ is set to increase as the acceleration operation amount increases. However, the target rotational frequency $\omega 1$ may be set to increase as the increase amount of the acceleration operation amount per unit time increases.

Moreover, in the above embodiment, the current sensor that detects the value of the current flowing through the solenoid of the clutch actuator 6 is described as the clutch sensor that detects the physical quantity corresponding to the engagement amount of the clutch 5. However, the clutch sensor is not limited to this. The clutch sensor may be able to detect a parameter that indirectly shows the engagement amount of the clutch 5. The clutch sensor may be able to recognize, from the detected value of the clutch sensor, the torque that can be transmitted by the friction clutch 5. For example, the clutch sensor may be a hydraulic sensor that detects the hydraulic pressure of the clutch actuator 6 or a displacement sensor that detects the displacement of one of the pair of contact members of the clutch relative to the other.

Moreover, in the above embodiment, the hydraulic actuator is described as the clutch actuator. However, the clutch actuator is not limited to this. The clutch actuator may be a different type of actuator, such as an electric motor. In this case, the clutch sensor may be a displacement sensor that detects the displacement of one of the pair of contact members of the clutch relative to the other or a current sensor that detects a current value of an electric motor.

The controller may determine the engagement amount of the clutch or the torque that can be transmitted by the clutch, by using input information or output information which has one-to-one correspondence with the engagement amount of the clutch. For example, the information input to the controller may be a value which is correlated to the engagement amount of the clutch and is detected by a sensor, such as a current sensor, a pressure sensor, or a displacement sensor. For example, the output information output from the controller may be a control command value of the solenoid valve. Moreover, the controller may calculate, as the clutch transmitting torque, a product of the engagement amount of the clutch and the rotational frequency of the input shaft.

Moreover, the above embodiment describes an example of the control in which in the vehicle start acceleration control of the HEV mode, the power of the electric motor 3 is not utilized, and only the power of the engine 2 is utilized. However, the vehicle start acceleration control of the HEV mode is not limited to this. For example, even in the vehicle start acceleration control of the HEV mode, only the power of the electric motor 3 may be utilized, or both of the power of the electric motor 3 and the power of the engine 2 may be utilized.

For example, when a remaining amount of a battery that supplies electric power to the electric motor 3 is adequate, i.e., when the remaining amount of the battery is not less than a predetermined value, the vehicle start acceleration control of the HEV mode may be control that utilizes the power of the electric motor 3. When the remaining amount of the battery is inadequate, i.e., when the remaining amount of the battery is less than the predetermined value, the vehicle start acceleration control of the HEV mode may be control that does not utilize the power of the electric motor 3 but utilizes the power of the engine 2.

The target rotational frequency $\omega 1$ set in the half-engaged traveling control may be determined based on at least the acceleration operation amount. The memory 20b may pre-store a map showing a correspondence relation between the acceleration operation amount and the target rotational frequency $\omega 1$, and the CPU 20a may refer to this map and set the target rotational frequency $\omega 1$ corresponding to the acceleration operation amount.

Moreover, the target rotational frequency $\omega 1$ set in the half-engaged traveling control may be a value set in consideration of the acceleration operation amount and at least one of the vehicle speed, the input rotational frequency, the engine rotational frequency, the motor rotational frequency, the change gear ratio, the speed change command, and the braking command. For example, the memory 20b may prestore a map showing a correspondence relation among i) the acceleration operation amount, ii) information including at least one of the vehicle speed, the input rotational frequency, the engine rotational frequency, the motor rotational frequency, the change gear ratio, the speed change command, and the braking command, and iii) the target rotational frequency $\omega 1$, and the CPU 20a may refer to the map and set the target rotational frequency $\omega 1$ corresponding to the acceleration operation amount and the information including at least one of the vehicle speed, the input rotational frequency, the engine rotational frequency, the motor rotational frequency, the change gear ratio, the speed change command, and the braking command. Thus, the acceleration feeling desired by the rider is easily obtained.

Moreover, in the above embodiment, the vehicle start acceleration control that utilizes the driving of the engine 2 is described as one example of the traveling control of the vehicle 1 in the half-engaged state. However, the traveling control of the vehicle 1 in the half-engaged state is applicable to situations other than the vehicle start acceleration. For example, when the rider performs a speed change operation with respect to the shift switch, the CPU 20a may control the clutch actuator such that to reduce the gear shift shock, the clutch is temporarily changed from the engaged state to the half-engaged state. In this case, the above-described half-engaged traveling control is applicable. The half-engaged traveling control is widely applicable to the traveling control in a state where the vehicle is traveling in the half-engaged state, such as a speed change accelerating state, a speed change decelerating state, and a decelerating state after speed change.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Disclosed Aspects

The following aspects disclose preferred embodiments.

First Aspect

A controller of a vehicle,
the vehicle including:
a driving source that generates power;
a driving wheel;
a friction clutch that transmits torque corresponding to an engagement amount of the friction clutch and is located on a power transmitting path through which the power is transmitted between the driving source and the driving wheel;
a clutch actuator that changes the engagement amount of the friction clutch; and
an acceleration operation sensor that detects an acceleration operation amount,
the controller including
processing circuitry configured to
determine whether or not the friction clutch is in an engaged state,
when it is determined that the friction clutch is not in the engaged state, control the clutch actuator such that the engagement amount of the friction clutch becomes a value corresponding to the acceleration operation amount received from the acceleration operation sensor, and
control the driving source such that output torque of the driving source becomes a value corresponding to the engagement amount or a value corresponding to a parameter corresponding to the engagement amount.

According to the above configuration, the output torque of the driving source can be controlled in consideration of the load change caused by the clutch engagement. Therefore, the excess and shortage of the output torque of the driving source are suppressed, and the output torque of the driving source against the load generated by the clutch engagement can be given. Since the excess and shortage of the output torque of the driving source are suppressed as above, the traveling feeling when the vehicle travels in the half-engaged state can be improved.

Second Aspect

The controller according to the first aspect, wherein the processing circuitry controls the driving source such that as the engagement amount of the friction clutch increases, the output torque of the driving source increases.

As the engagement amount of the friction clutch increases, the torque that can be transmitted by the friction clutch increases. Therefore, according to the above configuration, as the torque that can be transmitted by the friction clutch increases, the output torque of the driving source is made to increase. Thus, the decrease in the rotational frequency of the driving source by the clutch engagement is suppressed, and the traveling feeling when the vehicle travels in the half-engaged state can be improved.

Third Aspect

The controller according to the first or second aspect, wherein:
based on the acceleration operation amount received from the acceleration operation sensor, the processing circuitry sets required torque required as torque transmitted from the friction clutch toward the driving wheel through the power transmitting path;
the processing circuitry controls the clutch actuator such that the torque that is transmitted by the friction clutch becomes the set required torque; and
the processing circuitry controls the driving source such that the output torque of the driving source becomes larger than the set required torque.

According to the above configuration, the driving source is controlled such that the output torque of the driving source becomes larger than the torque that can be transmitted by the friction clutch. Therefore, the decrease in the rotational frequency of the driving source by the frictional force of the clutch can be prevented, and the acceleration corresponding to the acceleration operation is easily realized.

Fourth Aspect

The controller according to any one of the first to third aspects, wherein when it is determined that the friction clutch is not in the engaged state,
the processing circuitry sets a target rotational frequency based on the received acceleration operation amount, and
the processing circuitry controls the driving source such that a rotational frequency of the driving source approaches the target rotational frequency, and the output torque of the driving source becomes the value corresponding to the engagement amount or the value corresponding to the parameter corresponding to the engagement amount.

Fifth Aspect

The controller according to any one of the first to fourth aspects, wherein:
the vehicle includes a rotational frequency sensor that detects a rotational frequency of the driving source; and
when it is determined that the friction clutch is not in the engaged state,
based on the received acceleration operation amount, the processing circuitry sets required torque required as torque transmitted from the friction clutch toward the driving wheel through the power transmitting path,
the processing circuitry controls the clutch actuator such that the torque that is transmitted by the friction clutch becomes the set required torque,
the processing circuitry sets a target rotational frequency based on the received acceleration operation amount,
based on the set target rotational frequency and the rotational frequency of the driving source which is received from the rotational frequency sensor, the processing circuitry calculates rotational frequency control torque necessary to make the rotational frequency of the driving source reach the target rotational frequency, and
the processing circuitry controls the driving source such that the output torque of the driving source becomes torque obtained by adding the rotational frequency control torque to the required torque.

According to the above configuration, the output torque of the driving source is obtained by adding the rotational frequency control torque, which corresponds to the target rotational frequency and the actual rotational frequency of the driving source, to the required torque. Therefore, the responsiveness with respect to the target rotational frequency can be improved. Thus, the response time from when the rider performs the acceleration requirement operation until when the engine reaches the target rotational frequency can be shortened, and the driving feeling can be improved.

Sixth Aspect

The controller according to the fifth aspect, wherein:
when it is determined that the friction clutch is not in the engaged state, the processing circuitry controls the driving source such that the output torque of the driving source becomes the torque obtained by adding the rotational frequency control torque to the required torque; and
when it is determined that the friction clutch is in the engaged state, the processing circuitry controls the driving source such that the output torque of the driving source becomes the required torque.

According to the above configuration, the calculation logic of the output torque of the driving source is changed in accordance with whether the friction clutch is in the half-engaged state or the engaged state. While the friction clutch is in the half-engaged state, the excess and shortage of the output torque of the driving source can be suppressed while maintaining the acceleration. After the friction clutch is set to the engaged state, the output torque of the driving source is made to coincide with the required torque. Thus, the driving feeling close to the operational feeling of the rider can be realized at the time of the constant speed traveling, the deceleration traveling, and the like.

Seventh Aspect

The controller according to the fourth or fifth aspect, wherein the processing circuitry sets the target rotational frequency such that the target rotational frequency increases as the received acceleration operation amount increases.

According to the above configuration, the vehicle acceleration corresponding to the acceleration operation of the rider is easily obtained, and the traveling suitable for the acceleration can be realized.

Eighth Aspect

The controller according to the fourth or fifth aspect, wherein:
the vehicle includes a transmission located on the power transmitting path and between the friction clutch and the driving wheel; and
the processing circuitry sets the target rotational frequency based on the acceleration operation amount and a change gear ratio of the transmission.

According to the above configuration, the vehicle acceleration suitable for the change gear ratio of the transmission is easily obtained, and the traveling suitable for the acceleration can be realized.

Ninth Aspect

The controller according to the fourth or fifth aspect, wherein the processing circuitry sets the target rotational frequency such that the target rotational frequency becomes larger than an idle rotational frequency.

According to the above configuration, since the target rotational frequency can be increased from the idle rotational frequency, the occurrence of the stall due to the decrease in the rotational frequency of the driving source can be suppressed.

Tenth Aspect

A vehicle including:
the driving source;
the driving wheel;
the friction clutch;
the clutch actuator;
the acceleration operation sensor; and the controller according to any one of the first to ninth aspects.

Eleventh Aspect

A method of controlling a vehicle,
the vehicle including:
a driving source;
a driving wheel;
a friction clutch that transmits torque corresponding to an engagement amount of the friction clutch and is located on a power transmitting path through which power is transmitted between the driving source and the driving wheel; and
a clutch actuator that changes the engagement amount of the friction clutch,
the method including:
determining whether or not the friction clutch is in an engaged state;
when it is determined that the friction clutch is not in the engaged state, controlling the clutch actuator such that the engagement amount of the friction clutch becomes a value corresponding to an acceleration operation amount of a rider; and
controlling the driving source such that output torque of the driving source becomes a value corresponding to the engagement amount or a value corresponding to a parameter corresponding to the engagement amount.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

What is claimed is:

1. A controller for use in a vehicle with a driving source that generates power; a driving wheel; a friction clutch that transmits torque corresponding to an engagement amount of the friction clutch and is located on a power transmitting path through which the power is transmitted between the driving source and the driving wheel; a clutch actuator that changes the engagement amount of the friction clutch; and an acceleration operation sensor that detects an acceleration operation amount,
the controller comprising processing circuitry configured to:
  determine whether or not the friction clutch is in an engaged state,
  when it is determined that the friction clutch is not in the engaged state, control the clutch actuator such that the engagement amount of the friction clutch becomes a value corresponding to the acceleration operation amount received from the acceleration operation sensor, and
  when it is determined that the friction clutch is not in the engaged state, control the driving source such that output torque of the driving source becomes target torque obtained by adding torque for preventing an occurrence of stall of the driving source to torque that is transmitted by the friction clutch and corresponds to the engagement amount or a value of a parameter corresponding to the engagement amount.

2. The controller according to claim 1, wherein when it is determined that the friction clutch is not in the engaged state, the processing circuitry controls the driving source such that as the engagement amount of the friction clutch increases, the output torque of the driving source increases.

3. The controller according to claim 1, wherein:
when it is determined that the friction clutch is not in the engaged state,
based on the acceleration operation amount received from the acceleration operation sensor, the processing circuitry sets required torque required as torque transmitted from the friction clutch toward the driving wheel through the power transmitting path;
the processing circuitry controls the clutch actuator such that the torque that is transmitted by the friction clutch becomes the set required torque; and
the processing circuitry controls the driving source such that the output torque of the driving source becomes larger than the set required torque.

4. The controller according to claim 1, wherein when it is determined that the friction clutch is not in the engaged state,
the processing circuitry sets a target rotational frequency based on the received acceleration operation amount, and
the processing circuitry controls the driving source such that a rotational frequency of the driving source approaches the target rotational frequency, and the output torque of the driving source becomes the target torque.

5. The controller according to claim 4, wherein the processing circuitry sets the target rotational frequency such that the target rotational frequency increases as the received acceleration operation amount increases.

6. The controller according to claim 4, wherein:
the vehicle includes a transmission located on the power transmitting path and between the friction clutch and the driving wheel; and
the processing circuitry sets the target rotational frequency based on the acceleration operation amount and a change gear ratio of the transmission.

7. The controller according to claim 4, wherein the processing circuitry sets the target rotational frequency such that the target rotational frequency becomes larger than an idle rotational frequency.

8. The controller according to claim 1, wherein:
the vehicle includes a rotational frequency sensor that detects a rotational frequency of the driving source; and
when it is determined that the friction clutch is not in the engaged state,
based on the received acceleration operation amount, the processing circuitry sets required torque required as torque transmitted from the friction clutch toward the driving wheel through the power transmitting path,
the processing circuitry controls the clutch actuator such that the torque that is transmitted by the friction clutch becomes the set required torque,
the processing circuitry sets a target rotational frequency based on the received acceleration operation amount,
based on the set target rotational frequency and the rotational frequency of the driving source which is received from the rotational frequency sensor, the processing circuitry calculates rotational frequency control torque necessary to make the rotational frequency of the driving source reach the target rotational frequency, and
the processing circuitry controls the driving source such that the output torque of the driving source becomes torque obtained by adding the rotational frequency control torque to the required torque.

9. The controller according to claim 8, wherein:
when it is determined that the friction clutch is not in the engaged state, the processing circuitry controls the driving source such that the output torque of the driving source becomes the torque obtained by adding the rotational frequency control torque to the required torque; and
when it is determined that the friction clutch is in the engaged state, the processing circuitry controls the driving source such that the output torque of the driving source becomes the required torque.

10. A vehicle comprising:
the driving source;
the driving wheel;
the friction clutch;
the clutch actuator;
the acceleration operation sensor; and
the controller according to claim 1.

11. The controller according to claim 1, wherein:
when it is determined that the friction clutch is not in the engaged state,
based on the acceleration operation amount received from the acceleration operation sensor and information correlated to traveling speed of the vehicle, the processing circuitry sets required torque required as torque transmitted from the friction clutch toward the driving wheel through the power transmitting path;
the processing circuitry controls the clutch actuator such that the torque that is transmitted by the friction clutch becomes the set required torque; and
the processing circuitry controls the driving source such that the output torque of the driving source becomes larger than the set required torque.

12. The controller according to claim 1, wherein:
when it is determined that the friction clutch is not in the engaged state,
based on the acceleration operation amount received from the acceleration operation sensor and at least either one of a gear shift command or a braking command, the processing circuitry sets required torque required as torque transmitted from the friction clutch toward the driving wheel through the power transmitting path;
the processing circuitry controls the clutch actuator such that the torque that is transmitted by the friction clutch becomes the set required torque; and
the processing circuitry controls the driving source such that the output torque of the driving source becomes larger than the set required torque.

13. The controller according to claim 1, wherein:
when it is determined that the friction clutch is not in the engaged state,
based on the acceleration operation amount received from the acceleration operation sensor and predetermined various modes, the processing circuitry sets required torque required as torque transmitted from the friction clutch toward the driving wheel through the power transmitting path;
the processing circuitry controls the clutch actuator such that the torque that is transmitted by the friction clutch becomes the set required torque; and
the processing circuitry controls the driving source such that the output torque of the driving source becomes larger than the set required torque.

14. The controller according to claim 1, wherein when it is determined that the friction clutch is not in the engaged state,
the processing circuitry determines whether or not the friction clutch is in a half-engaged state that is a state where the friction clutch transmits torque while causing slipping,
the processing circuitry sets a target rotational frequency based on the received acceleration operation amount, and
when it is determined that the friction clutch is in the half-engaged state, the processing circuitry controls the driving source such that a rotational frequency of the driving source approaches the target rotational frequency, and the output torque of the driving source becomes the target torque.

15. The controller according to claim 1, wherein:
when the processing circuitry determines that a state of the vehicle is a vehicle start accelerating state where the friction clutch is not in the engaged state, and driving of the driving source is used,
the processing circuitry controls the clutch actuator such that a state of the friction clutch is changed from a disengaged state or a half-engaged state to the engaged state, and
the processing circuitry controls the driving source such that the output torque of the driving source becomes the target torque; and
when the processing circuitry determines that the state of the vehicle is a traveling state where the friction clutch is in the engaged state, and the driving of the driving source is used,
the processing circuitry controls the clutch actuator such that the friction clutch is maintained in the engaged state, and
the processing circuitry controls the driving source such that the output torque of the driving source becomes required torque; and
the required torque is torque required based on the acceleration operation amount as torque which is transmitted from the friction clutch toward the driving wheel through the power transmitting path.

16. A method of controlling a vehicle,
the vehicle including:
a driving source;
a driving wheel;
a friction clutch that transmits torque corresponding to an engagement amount of the friction clutch and is located on a power transmitting path through which power is transmitted between the driving source and the driving wheel; and
a clutch actuator that changes the engagement amount of the friction clutch,
the method comprising:
determining whether or not the friction clutch is in an engaged state;
when it is determined that the friction clutch is not in the engaged state, controlling the clutch actuator such that the engagement amount of the friction clutch becomes a value corresponding to an acceleration operation amount of a rider; and
when it is determined that the friction clutch is not in the engaged state, controlling the driving source such that output torque of the driving source becomes target torque obtained by adding torque for preventing an occurrence of stall of the driving source to torque that is transmitted by the friction clutch and corresponds to the engagement amount or a value of a parameter corresponding to the engagement amount.

* * * * *